United States Patent
Suda

(10) Patent No.: US 9,826,875 B2
(45) Date of Patent: Nov. 28, 2017

(54) CLEANING TOOL

(71) Applicant: UNI-CHARM CORPORATION, Ehime (JP)

(72) Inventor: Tomokazu Suda, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 20 days.

(21) Appl. No.: 14/766,434

(22) PCT Filed: Jan. 17, 2014

(86) PCT No.: PCT/JP2014/050859
§ 371 (c)(1),
(2) Date: Aug. 6, 2015

(87) PCT Pub. No.: WO2014/122963
PCT Pub. Date: Aug. 14, 2014

(65) Prior Publication Data
US 2015/0374193 A1    Dec. 31, 2015

(30) Foreign Application Priority Data
Feb. 7, 2013    (JP) .................. 2013-022755

(51) Int. Cl.
B29C 65/66    (2006.01)
A47L 13/16    (2006.01)
(Continued)

(52) U.S. Cl.
CPC ............... *A47L 13/16* (2013.01); *A47L 13/38* (2013.01); *A47L 13/46* (2013.01); *B29C 65/66* (2013.01); *B29C 66/344* (2013.01); *B32B 37/14* (2013.01); *D04H 1/541* (2013.01); *D04H 3/147* (2013.01); *B32B 2038/0028* (2013.01)

(58) Field of Classification Search
CPC ....... B29C 54/66; B29C 66/344; A47L 13/38; B32B 37/144
See application file for complete search history.

(56) References Cited

U.S. PATENT DOCUMENTS

| 4,720,415 A | 1/1988 | Vander Wielen et al. |
| 4,823,427 A | 4/1989 | Gibbs et al. |
| (Continued) | | |

FOREIGN PATENT DOCUMENTS

JP    2007-111297 A    5/2007

OTHER PUBLICATIONS

International Search Report dated Apr. 28, 2014 in International Application No. PCT/JP2014/050859.
(Continued)

*Primary Examiner* — William Bell
(74) *Attorney, Agent, or Firm* — Hauptman Ham, LLP

(57) ABSTRACT

To provide a production method for a cleaning tool and a cleaning body with which the attachment of a holding tool to the cleaning body is facilitated. Provided is a production method for a cleaning tool provided with a cleaning sheet, and a holding tool for holding the cleaning sheet. The cleaning sheet is provided with: a base part; and a first fiber assembly which is bonded to the base part. The production process includes a step in which tensile force imparted to the first fiber assembly is released, and fibers in a state of having been stretched by the tensile force are shrunk to form bent regions in the base part.

8 Claims, 21 Drawing Sheets

(51) Int. Cl.
    *B29C 65/00*     (2006.01)
    *D04H 3/147*    (2012.01)
    *A47L 13/38*    (2006.01)
    *A47L 13/46*    (2006.01)
    *B32B 37/14*    (2006.01)
    *D04H 1/541*    (2012.01)
    *B32B 38/00*    (2006.01)

(56) References Cited

U.S. PATENT DOCUMENTS

| | | |
|---|---|---|
| 2002/0016122 A1* | 2/2002 | Curro ................ A47L 1/15 |
| | | 442/381 |
| 2002/0127937 A1 | 9/2002 | Lange et al. |
| 2005/0120497 A1* | 6/2005 | Lynde ................ A47L 13/20 |
| | | 15/104.94 |
| 2005/0148260 A1 | 7/2005 | Kopacz et al. |
| 2009/0049633 A1 | 2/2009 | Takabayashi et al. |
| 2013/0232714 A1* | 9/2013 | Policicchio ........... A47L 13/38 |
| | | 15/233 |

OTHER PUBLICATIONS

Extended European Search Report in EP Application No. 14748496.8, dated Oct. 21, 2016.
Written Opinion in International Application No. PCT/JP2014/050859, dated Apr. 28, 2014.
Office Action in CN Application No. 201480007826.9, dated Feb. 4, 2017.

\* cited by examiner

CLEANING TOOL

RELATED APPLICATIONS

The present application is a National Phase of International Application Number PCT/JP2014/050859, filed Jan. 17, 2014, and claims priority of Japanese Patent Application No. 2013-022755 filed on Feb. 7, 2013.

TECHNICAL FIELD

The present invention relates to a cleaning tool for cleaning an object to be cleaned. Further, internal applications of PCT/JP2014/050860, PCT/JP2014/051585, PCT/JP2014/051586 and PCT/JP2014/051587 are respectively incorporated by reference.

BACKGROUND ART

Japanese Unexamined Patent Application Publication (JP-A) No. 2007-111297 discloses a cleaning article having a grip insertion part and a fiber layer provided on each of the upper and lower sides of the grip insertion part. The grip insertion part is formed by a pair of grip attaching sheets. When used, the cleaning article is attached to a grip.

PRIOR ART DOCUMENT

Patent Document

Patent Document 1: JP-A No. 2007-111297

SUMMARY OF THE INVENTION

Problem to be Solved by the Invention

In the cleaning article disclosed in JP-A No. 2007-111297, the grip insertion part is formed by a pair of grip attaching sheets. When the grip attaching sheets are in close contact with each other, an insertion opening for insertion of the grip is closed. Therefore, it is not user-friendly when a user attaches the grip to the cleaning article.

Accordingly, it is an object of the present invention to provide a method of manufacturing a cleaning tool and a cleaning sheet which have improved user-friendliness.

Means for Solving the Problem

In order to solve the above problem, according to a preferred aspect of the present invention, a method of manufacturing a cleaning tool having a cleaning sheet and a holder for holding the cleaning sheet is provided. The cleaning sheet has a base and a first fiber assembly connected to the base. The method includes the steps of: stretching at least part of fibers of the first fiber assembly by applying a prescribed tension at least to the first fiber assembly; bonding the stretched first fiber assembly to the base; and forming a bent region in the base by releasing the application of tension from the first fiber assembly and thereby shrinking the fibers stretched by the tension.

In a further aspect of the method according to the present invention, the prescribed tension applied to the first fiber assembly is applied to all of the fibers forming the first fiber assembly.

In a further aspect of the method according to the present invention, the prescribed tension applied to the first fiber assembly is applied only to fibers in a region of the first fiber assembly which is bonded to the base.

In a further aspect of the method according to the present invention, a prescribed tension is applied to the base in the step of bonding the stretched first fiber assembly to the base.

In a further aspect of the method according to the present invention, the base is formed by a first sheet element.

In a further aspect of the method according to the present invention, an insertion opening through which the holder is inserted is formed by superposing a second sheet element on the first sheet element and bonding the sheet elements.

In a further aspect of the method according to the present invention, the method includes a step of forming an insertion opening by the bent region.

In a further aspect of the method according to the present invention, the step of forming the insertion opening by the bent region includes a step of superposing the first fiber assembly, the first sheet element and the second sheet element and a step of bonding the first fiber assembly, the first sheet element and the second sheet element, and the application of tension is released from the first fiber assembly after the insertion opening is formed.

In a further aspect of the method according to the present invention, the step of forming the insertion opening by the bent region includes the steps of: bonding the first fiber assembly and the first sheet element; forming a bent region in the first sheet element by releasing the application of tension from the first fiber assembly; superposing the second sheet element on the first sheet element; and bonding the first sheet element and the second sheet element.

In a further aspect of the method according to the present invention, the second sheet element has a second fiber assembly.

In a further aspect of the method according to the present invention, the insertion opening is always kept open.

In a further aspect of the method according to the present invention, the base and the first fiber assembly have different elastic constants.

In order to solve the above problem, according to a preferred embodiment of the present invention, a method of manufacturing a cleaning sheet which is held by a holder to form a cleaning tool is provided. The cleaning sheet has a base and a first fiber assembly connected to the base. The method includes the steps of: stretching at least part of fibers forming the first fiber assembly by applying a prescribed tension at least to the first fiber assembly; bonding the stretched first fiber assembly to the base; and forming a bent region in the base by releasing the application of tension from the first fiber assembly and thereby shrinking the fibers stretched by the tension.

Effect of the Invention

According to the present invention, a method of manufacturing a cleaning tool and a cleaning sheet can be provided to facilitate attaching a holder to a cleaning element.

BEST MODES FOR CARRYING OUT THE INVENTION (Outline of Cleaning Tool)

An embodiment of the present invention is now described with reference to FIGS. 1 to 8. A structure of a cleaning tool A as one embodiment of a "cleaning tool" according to the present invention is now explained. Objects to be cleaned by using the cleaning tool A typically include surfaces to be cleaned (floors, walls, windows, ceilings, external walls, furniture, clothes, curtains, bedding, lighting, home electric appliances, etc.) inside and outside of houses, apartments, buildings, factories, vehicles, etc. and surfaces of human body parts to be cleaned. The surfaces to be cleaned may be either flat or curved, uneven or stepped.

Figure 1:
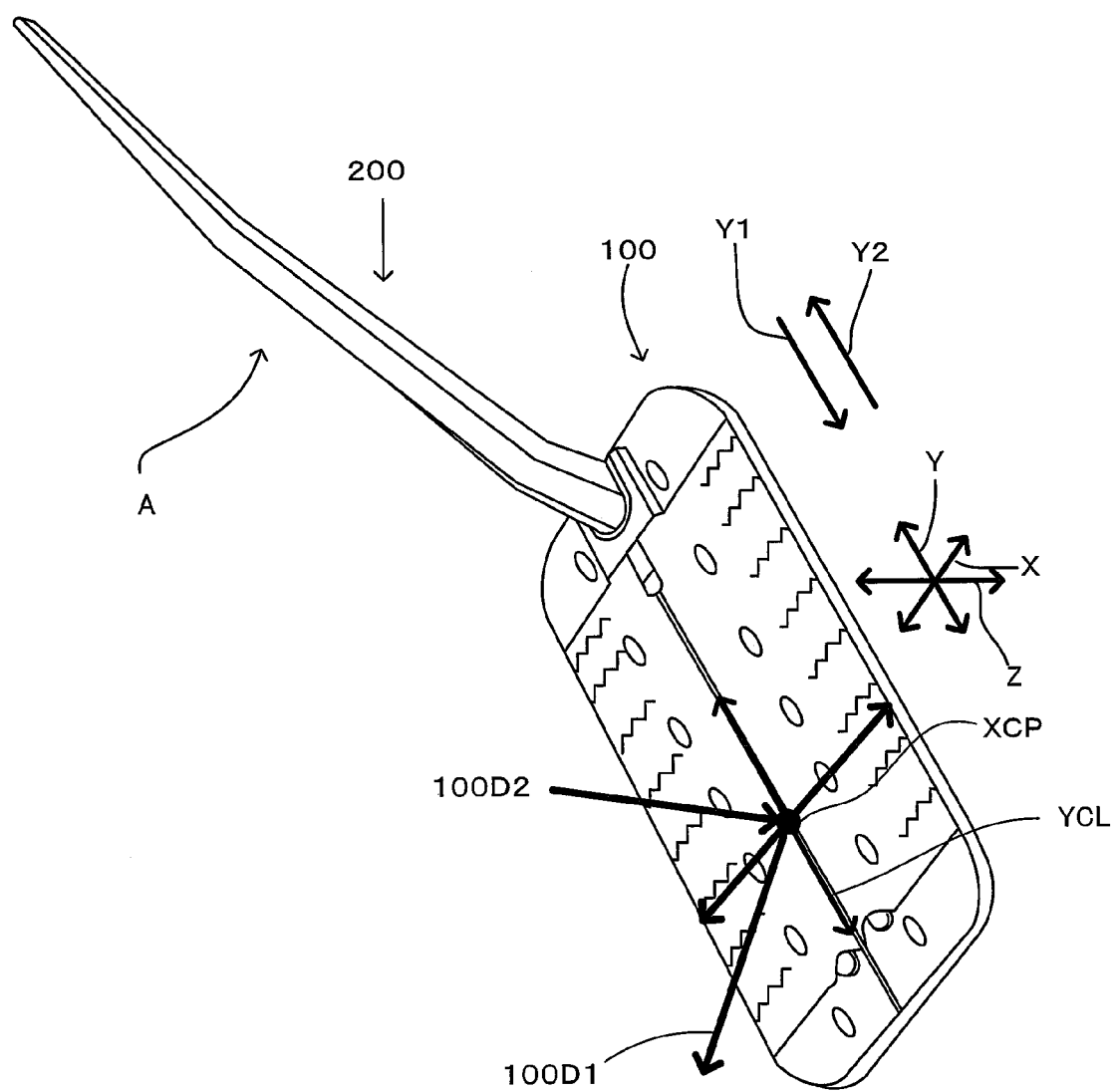
FIG. 1 is a perspective view showing an overall structure of a cleaning tool according to an embodiment of the present invention.

As shown in FIG. 1, the cleaning tool A includes a cleaning element holder 200 and a cleaning element 100. The cleaning element holder 200 is configured to be removably attached to the cleaning element 100 and to hold the cleaning element 100. The cleaning tool A, the cleaning element holder 200 and the cleaning element 100 are example embodiments that correspond to the "cleaning tool", the "holder" and the "cleaning sheet", respectively, according to this invention.

The cleaning element 100 is configured to extend in a longitudinal direction Y and a transverse direction X crossing the longitudinal direction Y. The longitudinal direction Y is defined by a direction parallel to a direction of insertion of the cleaning element holder 200 into the cleaning element 100. The direction of insertion of the cleaning element holder 200 into the cleaning element 100 is defined as an inserting direction Y1, and a direction opposite to the inserting direction Y1 is defined as a pulling-out direction Y2.

A direction crossing the longitudinal direction Y and the transverse direction X is defined as a thickness direction Z. The term "crossing" as used in this specification means "perpendicularly crossing" unless otherwise specified.

A center point of the cleaning element 100 in the transverse direction X is defined as a transverse direction center point XCP. The transverse direction center point XCP can be formed on a line passing through any point on the cleaning element 100 in the transverse direction X.

A line passing through the transverse direction center point XCP in parallel to the longitudinal direction Y is defined as a longitudinal center line YCL.

A direction away from the transverse direction center point XCP of the cleaning element 100 is defined as an outside direction 100D1, and a direction toward the transverse direction center point XCP of the cleaning element 100 is defined as an inside direction 100D2.

(Structure of the Cleaning Element Holder)

Figure 2:
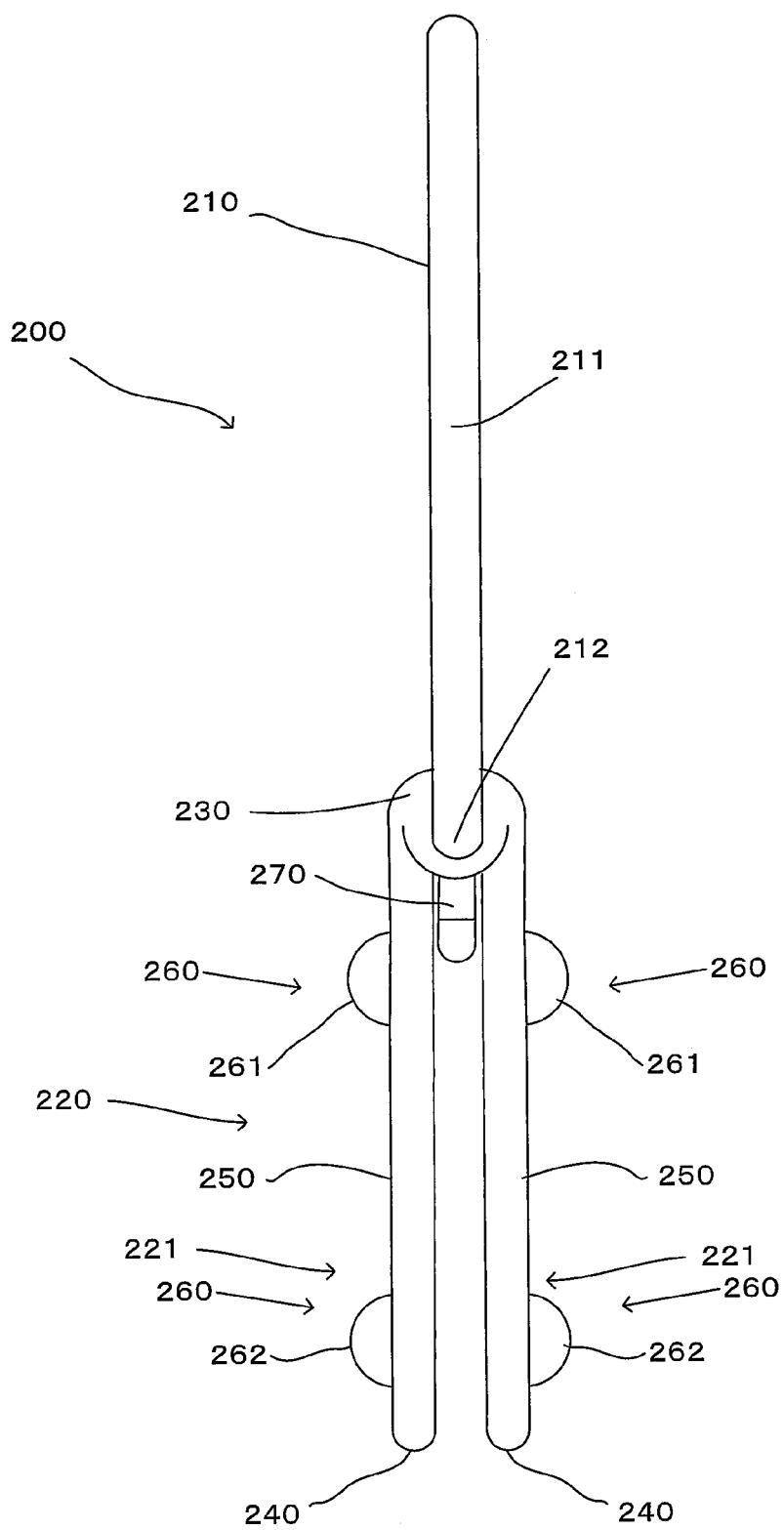
FIG. 2 is a plan view of a cleaning element holder.

As shown in FIG. 2, the cleaning element holder 200 mainly includes a handle part 210 and a cleaning element holding part 220. The handle part 210 is an elongate member to be held by a user during cleaning. The handle part 210 has a handle 211 and a handle connecting part 212. The handle connecting part 212 is connected to a connection part 230 of the cleaning element holding part 220. The handle 211 extends in an elongate form from the handle connecting part 212. The handle part 210 and the cleaning element holding part 220 are example embodiments that correspond to the "grip part" and the "holding part", respectively, according to this invention.

The cleaning element holding part 220 is a member formed of resin material and configured to hold the cleaning element 100. The cleaning element holding part 220 mainly includes a pair of elongate holding members 221, a projection 260 and a retaining plate 270. Specifically, polypropylene (PP) is used to form the cleaning element holding part 220. Flexible resin materials, such as polyethylene (PE), polyethylene terephthalate (PET), acrylonitrile butadiene styrene (ABS) and thermoplastic polyester elastomer, can be appropriately selected for the cleaning element holding part 220.

Each of the holding members 221 extends from the connection part 230 in a direction opposite to the direction in which the handle 211 extends. Specifically, the holding member 221 has the connection part 230, a tip part 240 and an intermediate part 250 extending from the connection part 230 to the tip part 240. The tip part 240 of the holding member 221 is a free end.

The projection 260 is formed in the outside direction 100D1 in the intermediate part 250. The projection 260 includes a first projection 261 formed on the connection part 230 side and a second projection 262 formed on the tip part 240 side.

The retaining plate 270 protrudes from the connection part 230 and extends parallel to the pair holding members 221 therebetween. The retaining plate 270 is convexly curved downward, and further has an engagement lug (not shown) on the underside.

(Structure of the Cleaning Element)

Figure 4:
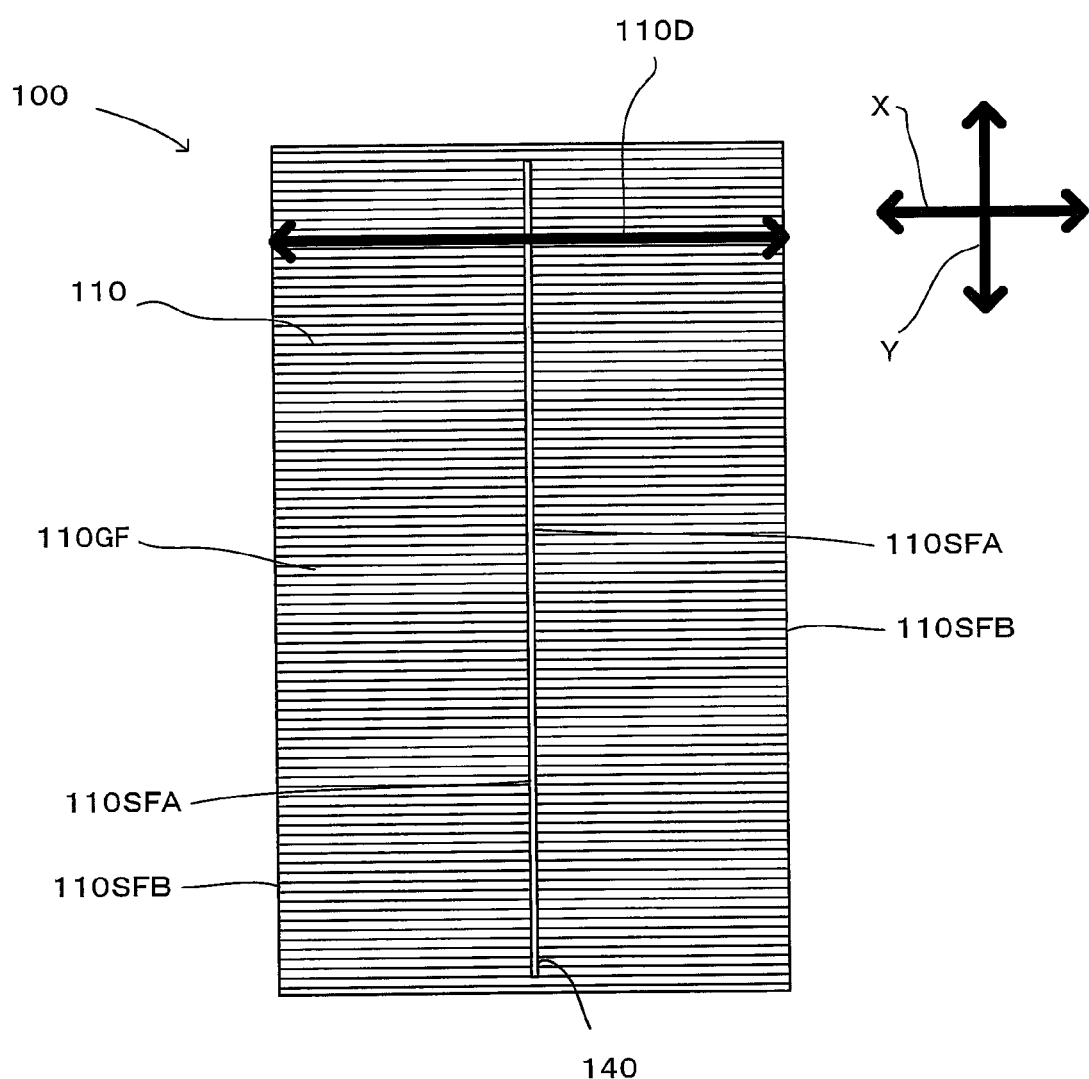
FIG. 4 is a plan view of the cleaning element as viewed from a brush part side.
Figure 5:
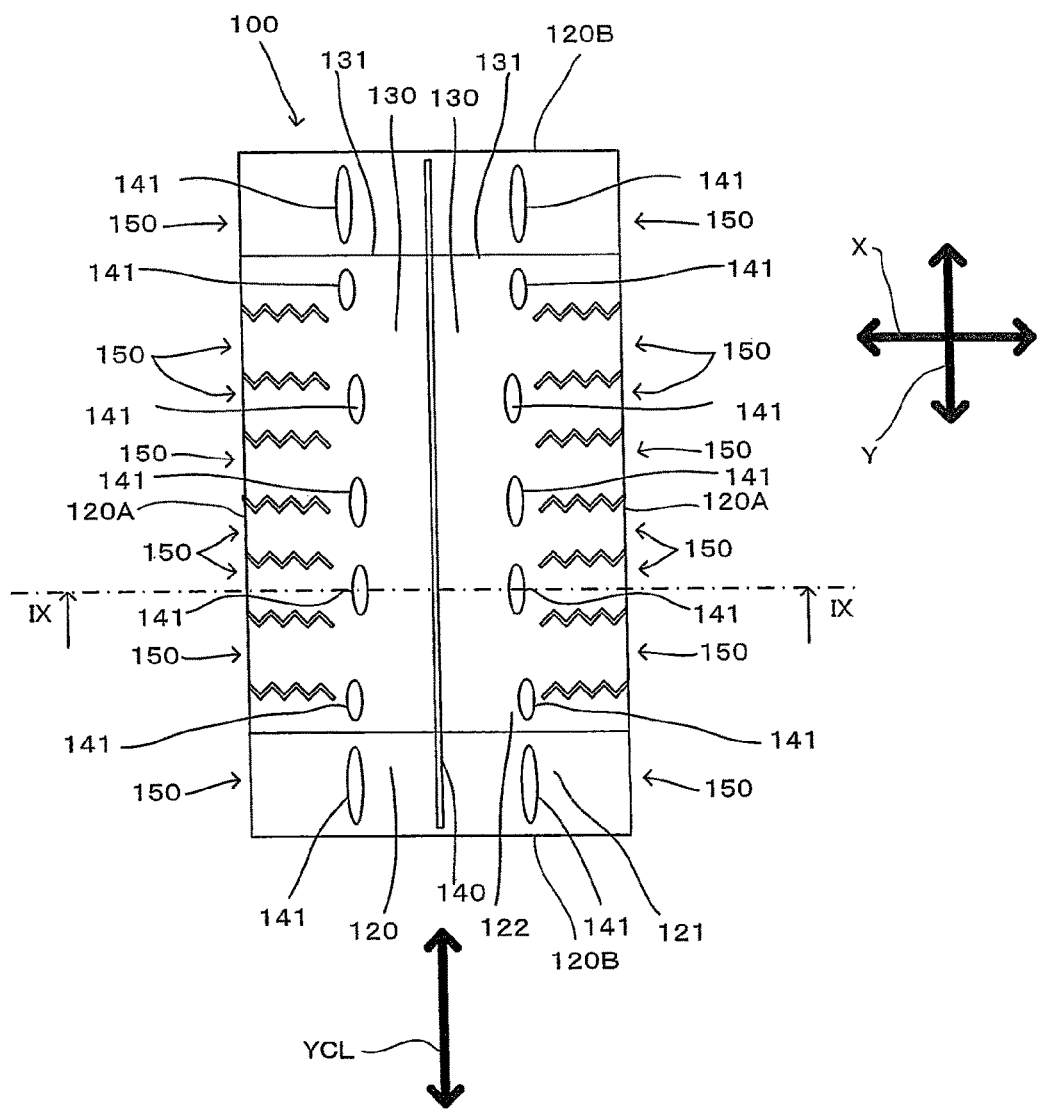
FIG. 5 is a plan view of the cleaning element as viewed from a second sheet element side.
Figure 6:
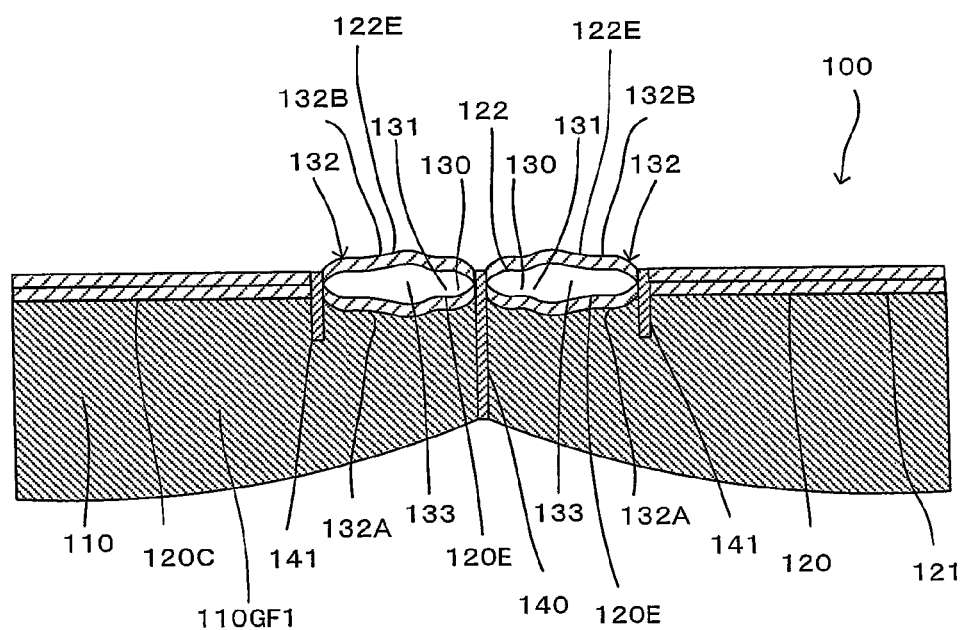
FIG. 6 is a sectional view taken along line IX-IX in FIG. 5.

The cleaning element 100 is now explained with reference to FIGS. 3 to 6. The cleaning element 100 has a sheet-like form and has a dirt collecting function of collecting dust or dirt on an object to be cleaned. As shown in FIGS. 4 and 5, the cleaning element 100 is rectangular in plan view.

The cleaning element 100 may be of disposable type designed for single use, disposable type designed for multiple use which can be used several times, while holding dust or dirt collected from the cleaning surface to be cleaned, or reusable type which can be reused by washing.

A base 120 of the cleaning element 100 is formed by a first sheet element 121. The base 120 has ends 120A in the transverse direction X and ends 120B in the longitudinal direction Y, and one side 120C and the other side 120D. The base 120, the first sheet element 121, the one side 120C and the other side 120D are example embodiments that correspond to the "base", the "first sheet element", the "one side" and "the other side", respectively, according to this invention.

A fiber assembly 110GF is disposed on the one side 120C of the base 120. A second sheet element 122 is disposed on the other side 120D of the base 120.

The base 120, the fiber assembly 110GF and the second sheet element 122 which are thus superposed one on the other extend in an elongate form in the longitudinal direction Y of the cleaning element 100.

The fiber assembly 110GF forms a brush part 110 having a dirt collecting function. The fiber assembly 110GF and the brush part 110 are example embodiments that correspond to the "fiber assembly" and the "brush part", respectively, according to this invention. The fiber assembly 110GF which is disposed on the one side 120C of the base 120 like in the cleaning element 100 of this embodiment is defined as a first fiber assembly 110GF1. The first fiber assembly 110GF1 is an example embodiment that corresponds to the "first fiber assembly" according to this invention.

The fiber assembly 110GF is formed by an assembly of fibers 110SF. In this invention, the fiber 110SF is a single fiber structure formed by typical fibers, a fiber structure having typical fibers aligned in the length direction and/or the radial direction (twist yarn, spun yarn, yarn to which a plurality of filaments are partially connected), or an assembly of the fiber structures. The "typical fibers" as used herein are components of yarn, textile or the like and are thin and flexible fibers having a substantially longer length compared with the thickness. Typically, a long continuous fiber is defined as a filament and a short fiber as a staple.

The fibers 110SF contain thermoplastic fibers in part and can be fusion bonded (or welded).

The fiber assembly 110GF is formed of fibers 110SF which are arranged side by side along a prescribed direction of fiber orientation 110D and stacked in the thickness direction Z. In this embodiment, the direction of fiber orientation 110D substantially coincides with the transverse direction X. The fibers 110SF are flexible and thus easily bent and deformed. Therefore, the direction of fiber orientation 110D of the fibers 110SF refers to the fiber orientation in design of the product.

The fibers 110SF of the fiber assembly 110GF have a connection end 110SFA which is welded to a central bonded part 140. Further, the fibers 110SF have an open end 110SFB on the opposite side to the connection end 110SFA. The open end 110SFB is a free end.

Figure 3:
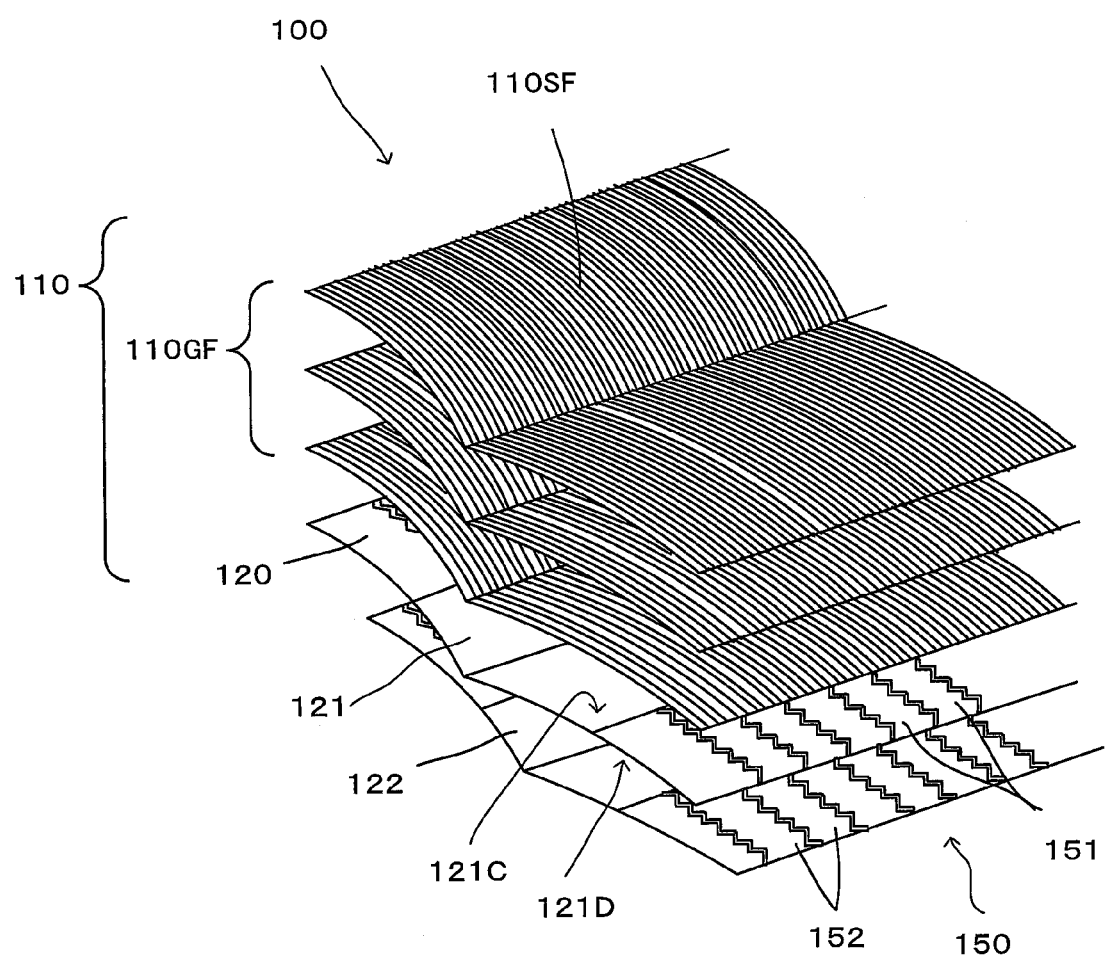
FIG. 3 is a perspective view of a cleaning element, in a state separated into elements.

In FIG. 3, the fiber assembly 110GF is formed by three fiber layers, but the number of fiber layers may be one or more other than three as necessary. Preferably, the fiber assembly 110GF has a planar structure having a predetermined flat or curved surface and has a three-dimensional form having a certain thickness or has a thin sheet-like form. The fiber assembly 110GF is typically formed of polyethylene (PE), polypropylene (PP), polyethylene terephthalate (PET), nylon, rayon or the like. In practical use, an assembly of filaments formed by opening a tow is preferably used as the fiber assembly 110GF. It is particularly preferable that the fiber assembly 110GF comprises conjugated fibers having a core of polypropylene (PP) or polyethylene terephthalate (PET) and a core covering sheath of polyethylene (PE). Further, the fibers 110SF of the fiber assembly 110GF preferably have a fineness of 1 to 50 dtex, or more preferably 2 to 10 dtex. Each fiber assembly may contain fibers of substantially the same fineness, or it may contain fibers of different finenesses.

Further, in order to enhance the dirt collecting function in cleaning, oil is applied to the fiber assembly 110GF. The oil is mainly composed of liquid paraffin.

Further, in order to enhance the sweeping-out function in cleaning, it is preferred to use the fiber assembly 110GF including the fibers 110SF having higher rigidity or the fibers 110SF having higher fineness. It is further preferred that the fiber assembly 110GF has crimped fibers. Here, the crimped fibers are fibers subjected to a prescribed crimping process and easily intertwined with each other. By using such crimped fibers, the fiber assembly 110GF becomes bulkier than before the cleaning element holder 200 is attached to the cleaning element, and dust can be easily captured by the crimped portions. This structure can be realized especially by using crimped fibers opened from tows.

As shown in FIG. 5, the second sheet element 122 is a rectangular nonwoven fabric sheet which is shorter than the base 120 in the longitudinal direction Y.

The base 120 (the first sheet element 121) and the second sheet element 122 are typically formed of sheet-like nonwoven fabric comprising thermal melting fibers (thermoplastic fibers). Therefore, the base 120 and the second sheet element 122 are also referred to as "nonwoven fabric sheet". In order to enhance the sweeping-out function in cleaning, it is preferred to use the nonwoven fabric having higher rigidity.

The nonwoven fabric is formed of synthetic fibers such as polyethylene (PE), polypropylene (PP) and polyethylene terephthalate (PET). Further, the nonwoven fabric is manufactured by through-air bonding or spun bonding.

Not only the nonwoven fabric, however, cloth or synthetic resin film may also be used.

Figure 7:
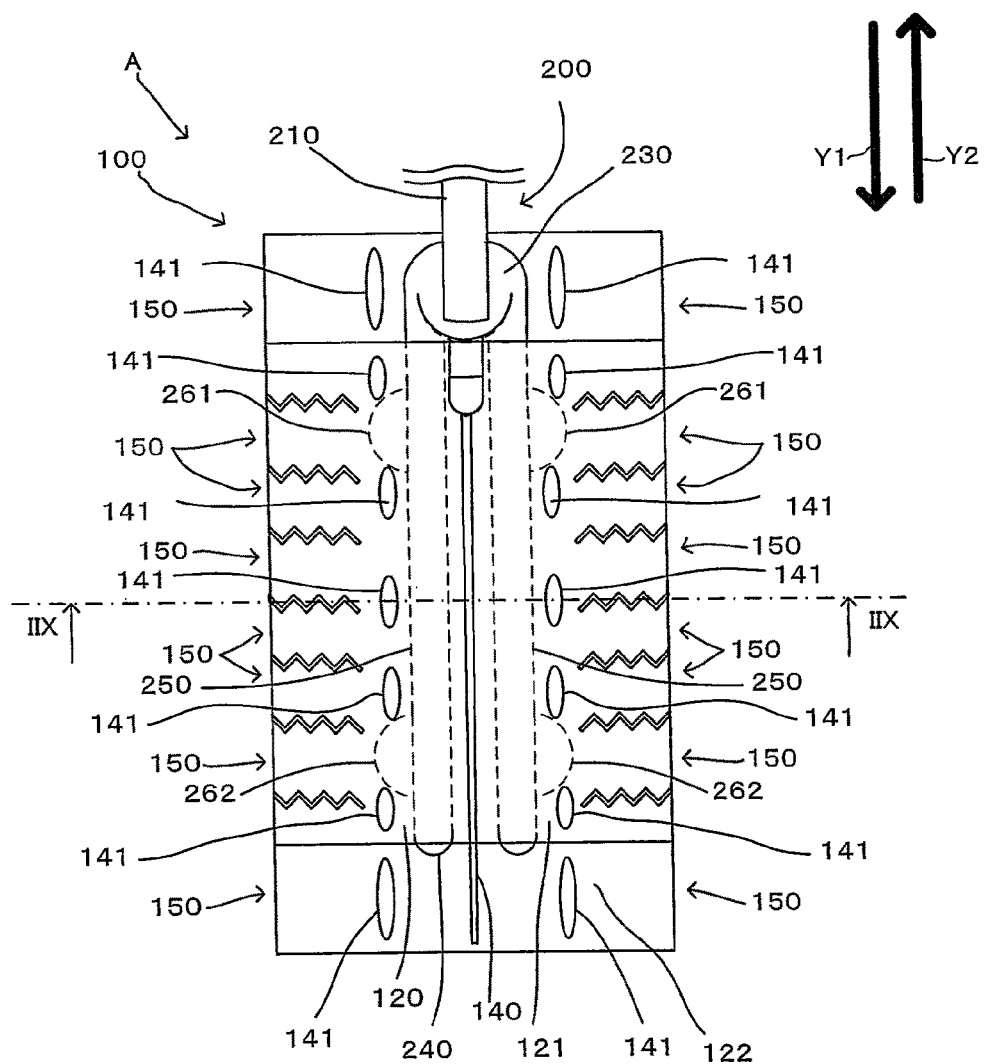
FIG. 7 is a drawing for showing engagement of the cleaning element holder with the cleaning element.

The base 120 and the second sheet element 122 are welded at the central bonded part 140 extending along the longitudinal center line YCL of the cleaning element 100, and at a plurality of first bonded parts 141 arranged on the both sides of the central bonded part 140. Specifically, as shown in FIG. 7, the base 120, the second sheet element 122 and the fiber assembly 110GF are welded at the central bonded part 140. Further, the base 120, the second sheet element 122 and part of the fiber assembly 110GF are welded at the first bonded parts 141. The first bonded parts 141 located on the both end regions in the longitudinal direction Y are formed in positions where the second sheet element 122 does not exist. Therefore, the first bonded parts 141 located on the both end regions in the longitudinal direction Y only bond the base 120 and part of the fiber assembly 110GF.

A pair of holding spaces 130 are formed between the base 120 and the second sheet element 122 in a region between the central bonded part 140 and the first bonded parts 141 and extend in the longitudinal direction Y. Each of the holding spaces 130 has insertion openings 131 on the both ends in the longitudinal direction Y. The holding space 130 and the insertion opening 131 are example embodiments that correspond to the "insertion part" and the "insertion opening" according to this invention.

In other words, the holding spaces 130 are defined by a prescribed region of the base 120 and a prescribed region of the second sheet element 122 which extend between the pair first bonded parts 141 in the transverse direction X.

The first bonded parts 141 are continuously formed substantially along the longitudinal direction Y. It is not necessary for adjacent ones of the first bonded parts 141 in the longitudinal direction Y to be aligned in the longitudinal direction Y. The arrangement pattern of the first bonded parts 141 can be appropriately designed according to the design and the shape of the cleaning element holding part 220. Naturally, the first bonded part 141 may also be formed in a continuous linear shape.

The central bonded part 140 and the first bonded parts 141 are formed by heat welding.

The bonded parts according to this invention may also be formed by ultrasonic welding, sewing or adhesives such as a hot-melt adhesive.

Each of the insertion openings 131 has an insertion opening edge 132. The insertion opening edge 132 has a first edge region 132A formed in the base 120 and a second edge region 132B formed in the second sheet element 122.

The first edge region 132A has a first bent region 120E formed by bending. The first bent region 120E is an example embodiment that corresponds to the "first bent region" according to this invention.

The second edge region 132B has a second bent region 122E formed by bending.

The first bent region 120E and the second bent region 122E are formed between the pair first bonded parts 141. The first bent region 120E is formed by making a portion of the base 120 (the first sheet element 121) between the first bonded parts 141 longer than the linear distance between the first bonded parts 141 in the transverse direction X. Similarly, the second bent region 122E is formed by making a portion of the second sheet element 122 between the first bonded parts 141 longer than the linear distance between the first bonded parts 141 in the transverse direction X.

The base 120 or the second sheet element 122 is "bent" in this invention means that it is "not straight", and is bent, folded, deformed, curved or otherwise made uneven.

In other words, the insertion opening 131 is formed by superposing the first bent region 120E and the second bent region 122E. Specifically, by provision of the first bent region 120E and the second bent region 122E, the insertion opening 131 is formed with a part where the base 120 and the second sheet element 122 do not come in contact with each other. This part forms a separation region 133.

Therefore, the insertion opening 131 is always kept open even when the holding part 220 is not inserted.

The cleaning element 100 has strips 150. The strips 150 include first strips 151 formed between a plurality of cuts in the end regions of the base 120 in the transverse direction X, and second strips 152 formed between a plurality of cuts in the end regions of the second sheet element 122 in the transverse direction X. The cuts in the base 120 and the second sheet element 122 are formed in zigzag. By provision of the zigzag strips 150, a structure having an excellent cleaning function, or particularly a function capable of easily catching and capturing dust or dirt can be realized. Further, the strips 150 may have a single kind or plural kinds of shapes appropriately selected from various shapes, such as zigzag, linear and curved shapes.

As the strips 150, only either one of the first strips 151 and the second strips 152 may be used.

(Engagement of the Cleaning Element Holder and the Cleaning Element)

Figure 8:
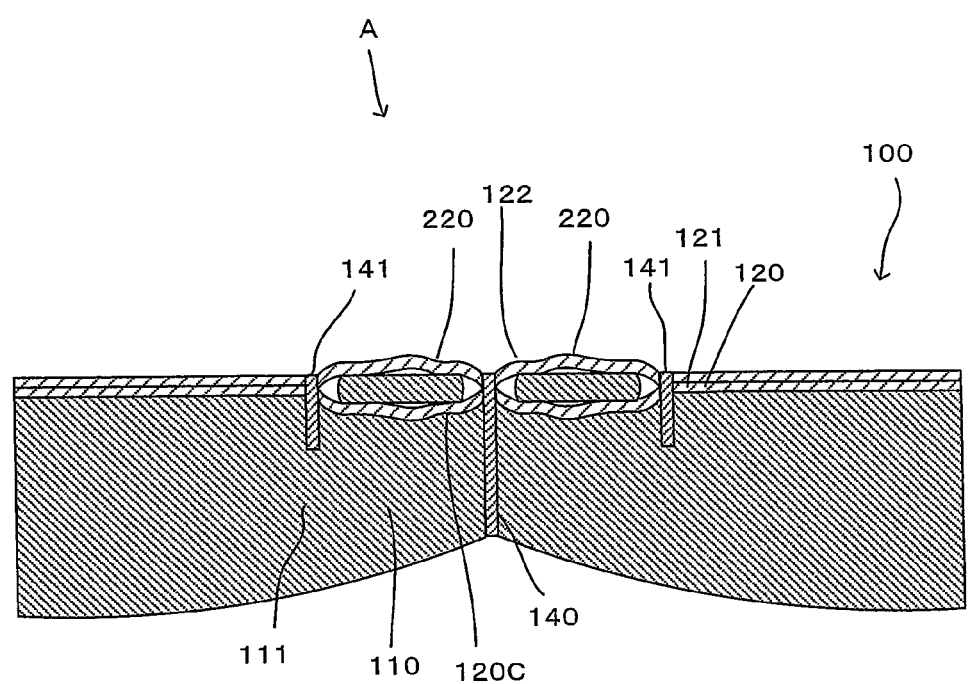
FIG. 8 is sectional view taken along line IIX-IIX in FIG. 7.

Engagement of the cleaning element holder 200 and the cleaning element 100 is explained with reference to FIGS. 7 and 8. As shown in FIG. 7, the holding members 221 can be inserted into the holding spaces 130. The cleaning element 100 is held by the cleaning element holder 200 by inserting the holding members 221 into the holding spaces 130 along the inserting direction Y1. In order to disengage the cleaning element holder 200 and the cleaning element 100 from each other, the cleaning element holder 200 is pulled out of the holding spaces 130 along the pulling-out direction Y2.

When the cleaning element holder 200 and the cleaning element 100 are engaged with each other, the projection 260 is located between the adjacent first bonded parts 141. As a result, the engagement between the cleaning element holder 200 and the cleaning element 100 is reliably maintained.

Further, the second sheet element 122 is held between the retaining plate 270 and the holding members 221.

The separation region 133 is formed in the insertion opening 131. Therefore, when inserting the holding member 221 into the holding space 130, the user can readily recognize the position of the insertion opening 131. Specifically, the user can easily insert the tip part 240 of the holding member 221 through the insertion opening 131.

Thus, the cleaning tool A of the present invention is user-friendly.

(Manufacturing Process)

A method of manufacturing the cleaning tool A according to the present invention is now explained with reference to FIGS. 9 to 17. Prior to explanation of the specific manufacturing process, the fibers 110SF forming the fiber assembly 110GF according to the present invention is explained.

Figure 9:
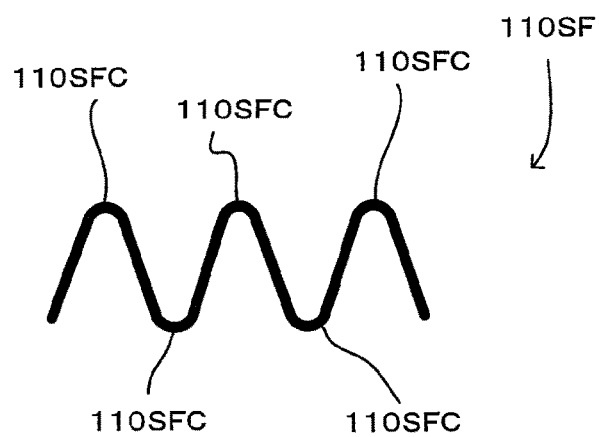
FIG. 9 is an explanatory drawing for showing the state of fibers.

FIG. 9 shows the fiber 110SF forming the fiber assembly 110GF, in a stationary state in which an external force is not applied. The fiber 110SF is crimped and thus has a zigzag shape having a plurality of bent parts 110SFC. The bent parts 110SFC are also referred to as crimps.

Figure 10:
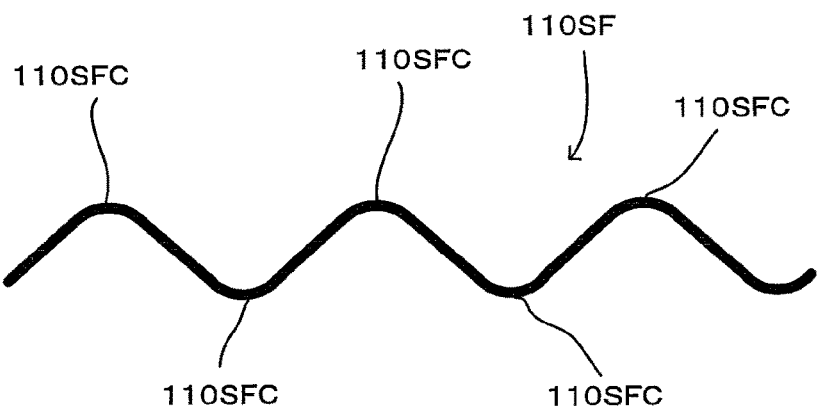
FIG. 10 is an explanatory drawing for showing the state of fibers.

The fiber 110SF having the bent parts 110SFC is stretchable. FIG. 10 shows the fiber 110SF in which an external force (tension) is applied to the both ends in a direction away from each other. The fiber 110SF thus stretches as the distance between the bent parts 110SFC increases. When the external force is released, the fiber 110SF returns from the stretched state shown in FIG. 10 to the stationary state shown in FIG. 9.

Here, the base 120 and the fiber assembly 110GF have different modulus of elasticity in tension. Specifically, the fiber assembly 110GF has a higher modulus of elasticity in tension (75.5%) than the base 120 (56.0%).

The modulus of elasticity in tension was measured by the following test.
(1) A specimen of the fiber assembly 110GF and a specimen of the base 120 are prepared, each 500 mm long.

For the fiber assembly 110GF, a fiber tow formed of conjugated fibers having a sheath of polyethylene (PE) and a core of polyethylene terephthalate (PET) is used. A fiber of the fiber tow has a fineness of 3.5 dtex, and the fiber assembly has a fineness of 110,000 dtex as a whole.

For the base 120, a spunbond nonwoven fabric formed of conjugated fibers having a sheath of polyethylene (PE) and a core of polyethylene terephthalate (PET) is used. The nonwoven has a basis weight of 20 g/m² and a width of 190 mm.
(2) Marks indicating a starting end and a terminal end of a prescribed length, which is set to 200 mm, in the longitudinal direction is put on each specimen. The distance between the starting end and the terminal end is designated by L0, which is 200 mm.

The upper end of each specimen is fixed by a clip.
(3) A weight of 5 kg is hanged such that a load is applied to the entire width of the lower end of each specimen.
(4) After a lapse of 30 seconds, the distance between the marks of the starting end and the terminal end on the specimen is measured. This distance is designated by L1.
(5) The weight is removed, and subsequently, after a lapse of 30 seconds, the distance between the marks of the starting end and the terminal end on the specimen is measured. This distance is designated by L2.
(6) The modulus of elasticity in tension is obtained by multiplying the value obtained by dividing the difference between L1 and L2 by the difference between L1 and L0, by 100.
(7) This test is conducted five times and an average value is obtained.

Figure 11:
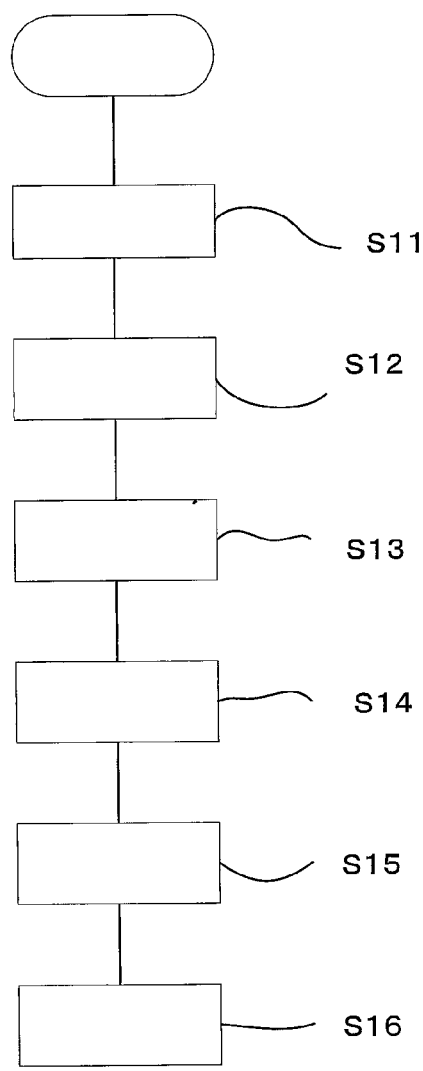
FIG. 11 is a flow chart for showing a manufacturing process according to the embodiment of the present invention.

FIG. 11 is a flow chart showing the manufacturing process. The manufacturing process includes a first step S11 of laminating materials for the base 120, the second sheet element 122 and part of the fiber assembly 110GF, a second step S12 of bonding the materials laminated in the first step S11, a third step S13 of laminating part of the fiber assembly 110GF on the materials bonded in the second step S12, a fourth step S14 of bonding the materials laminated in the third step S13, a fifth step S15 of cutting the materials bonded in the fourth step S14 into a prescribed shape, and a sixth step S16 of forming the bent region 120E in the base 120.

The cleaning element 100 of this embodiment has the strips 150, but the manufacturing process of the strips 150 is not described for convenience of explanation.

Figure 12:
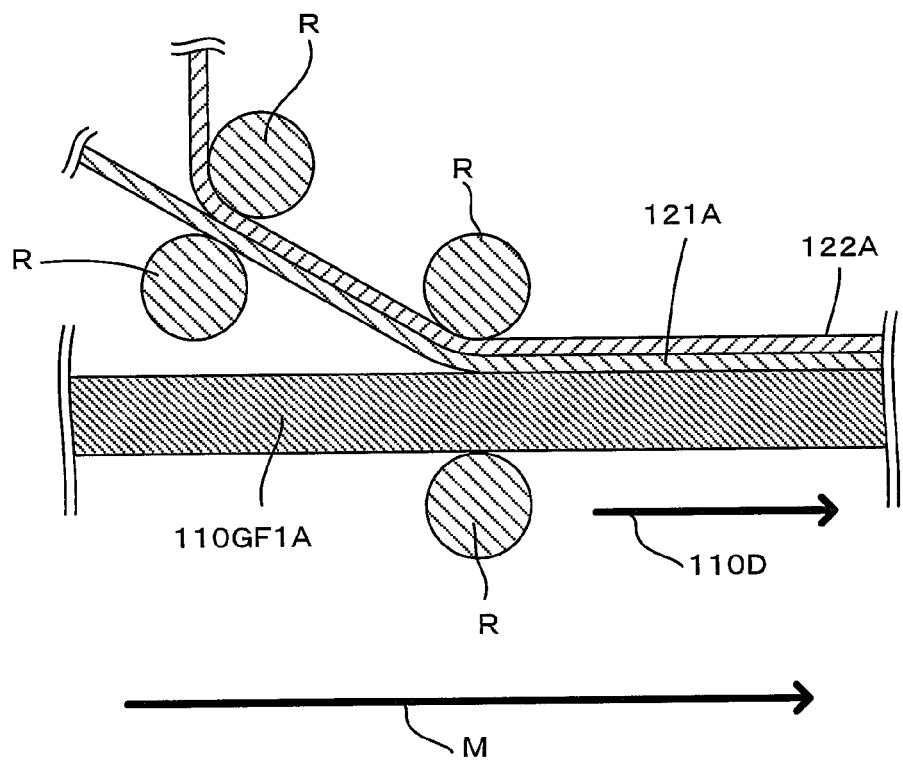
FIG. 12 is an explanatory drawing for illustrating a first step.

FIG. 12 shows the first step S11. In the first step S11, a first sheet material 121A for forming the first sheet element 121 for the base 120, a second sheet material 122A for forming the second sheet element 122, and a first fiber assembly material 110GF1A for forming part of the first fiber assembly 110GF1 are fed. As a result, the first fiber assembly material 110GF1A is disposed on one side of the first sheet material 121A, and the second sheet material 122A is disposed on the other side of the first sheet material 121A.

In the manufacturing process of the present invention, each material is supported by a support roller R and transferred in the machine direction M by a driving mechanism which is not shown.

The direction of fiber orientation 110D of the first fiber assembly material 110GF1A generally coincides with the machine direction M.

Figure 13:
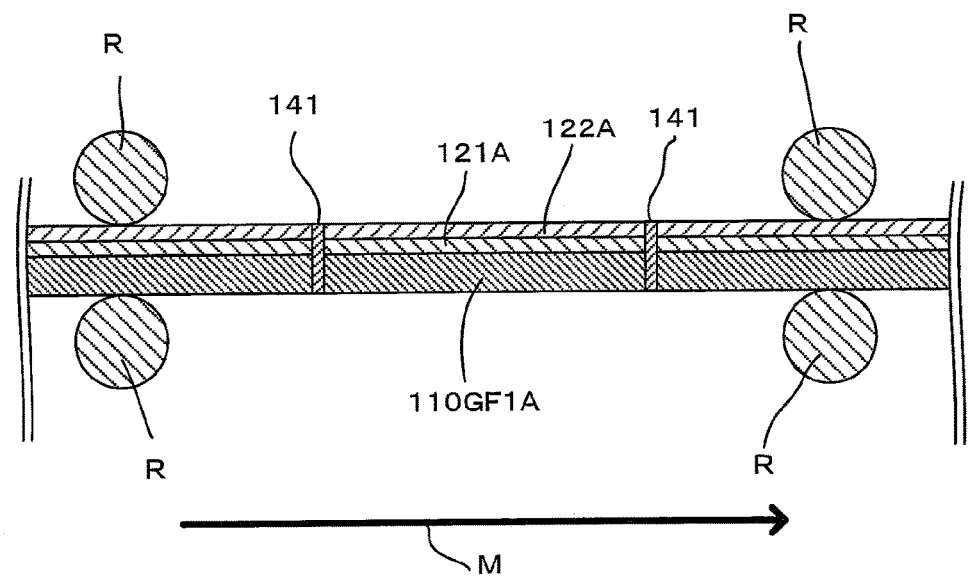
FIG. 13 is an explanatory drawing for illustrating a second step.

FIG. 13 shows the second step S12. In the second step S12, the second sheet material 122A, the first sheet material 121A and the first fiber assembly material 110GF1A are all welded. At this time, the second sheet material 122A, the first sheet material 121A and the first fiber assembly material 110GF1A are welded at two parts in prescribed regions. The welded parts form a pair of the first bonded parts 141.

Figure 14:
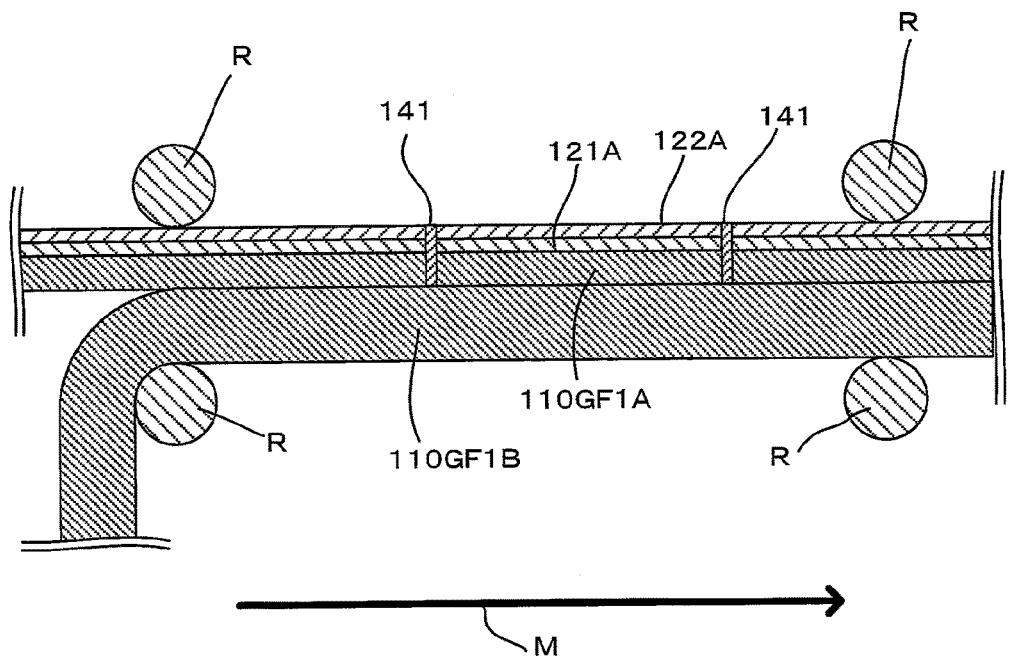
FIG. 14 is an explanatory drawing for illustrating a third step.

FIG. 14 shows the third step S13. In the third step S13, a second fiber assembly material 110GF1B is fed. The second fiber assembly material 110GF1B is fed onto one side of the first fiber assembly material 110GF1A on which the first sheet material 121A is not disposed.

The direction of fiber orientation 110D of the second fiber assembly material 110GF1B generally coincides with the machine direction M.

Figure 15:
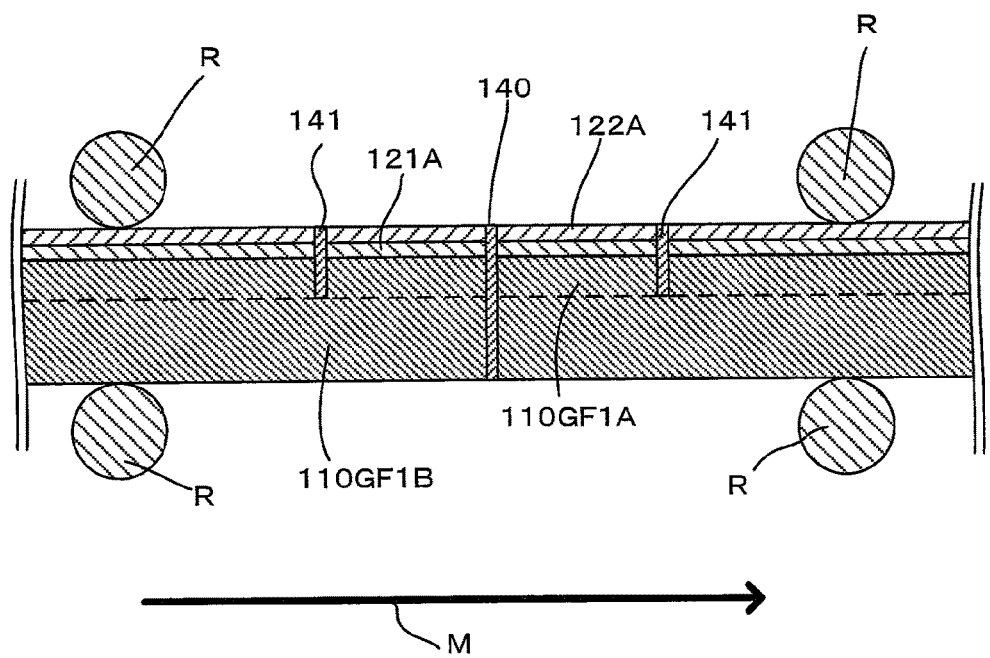
FIG. 15 is an explanatory drawing for illustrating a fourth step.

FIG. 15 shows the fourth step S14. In the fourth step S14, the second sheet material 122A, the first sheet material 121A, the first fiber assembly material 110GF1A and the second fiber assembly material 110GF1B are all bonded by heat welding. This bonding is made at an intermediate part between the first bonded parts 140. This bonded part forms the central bonded part 140.

In the first step S11 to the fourth step S14, a prescribed tension, particularly of 40 N, is applied to the first fiber assembly material 110GF1A. This is an example embodiment that corresponds to the "step of stretching at least part of fibers forming the first fiber assembly by applying a prescribed tension at least to the first fiber assembly" according to this invention.

Thus, particularly in the second step S12, the first fiber assembly material 110GF1A to which the prescribed tension is applied is bonded to the first sheet material 121A for forming the base 120. This is an example embodiment that corresponds to the "step of bonding the stretched first fiber assembly to the base" according to this invention.

The tension is applied to the first fiber assembly material 110GF1A in order to stabilize the shape of the first fiber assembly material 110GF1A and thereby facilitate manufacturing.

Further, in a subsequent manufacturing step which is described below, the tension is applied to shrink the fibers 110SF of the fiber assembly material 110GF and form the bent region 120E in the base 120.

In this sense, for the purpose of forming the bent region 120E in the base 120, it is sufficient to apply a prescribed tension only to the first fiber assembly material 110GF1A. This is an example embodiment that corresponds to the feature that "the prescribed tension applied to the first fiber assembly is applied only to fibers in a region of the first fiber assembly which is bonded to the base" according to this invention.

Further, this prescribed tension can also be applied to the second fiber assembly material 110GF1B. In this case, the fibers 110SF of the second fiber assembly material 110GF1B also shrink in a subsequent manufacturing step. Thus, the second fiber assembly material 110GF1B does not impede shrinkage of the first fiber assembly material 110GF1A. This is an example embodiment that corresponds to the feature that "the prescribed tension applied to the first fiber assembly is applied to all of the fibers forming the first fiber assembly" according to this invention.

Tension is also applied to the first sheet material 121A and the second sheet material 122A to stabilize the shape. This is an example embodiment that corresponds to the feature that "a prescribed tension is applied to the base in the step of bonding the stretched first fiber assembly to the base" according to this invention.

Figure 16:
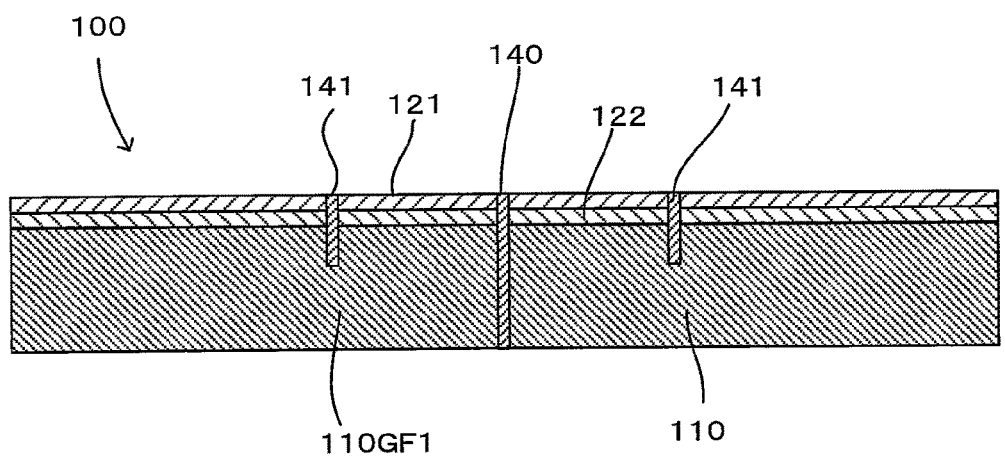
FIG. 16 is an explanatory drawing for illustrating a fifth step.

FIG. 16 shows the fifth step S15. In the fifth step S15, the second sheet material 122A, the first sheet material 121A, the first fiber assembly material 110GF1A and the second fiber assembly material 110GF1B are cut at prescribed regions. By this cutting, the second sheet material 122A, the first sheet material 121A, the first fiber assembly material 110GF1A and the second fiber assembly material 110GF1B are released from tension.

Figure 17:
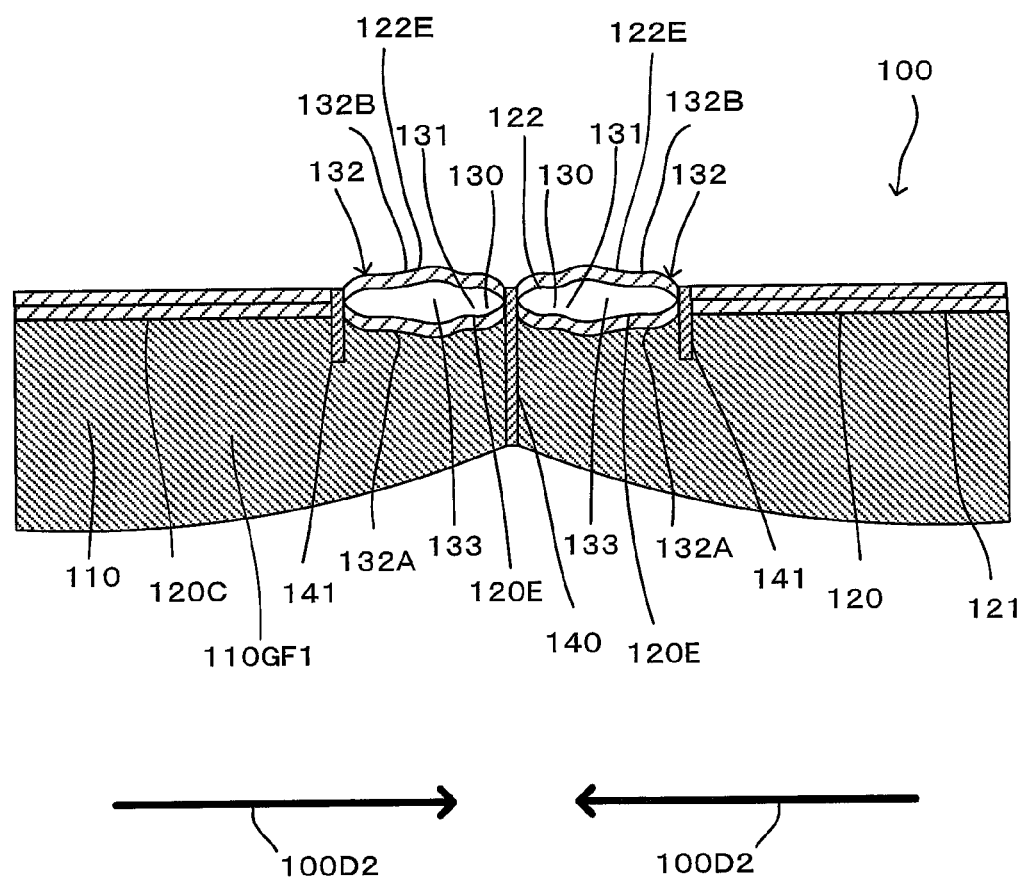
FIG. 17 is an explanatory drawing for illustrating a sixth step.

FIG. 17 shows the sixth step S16. In the sixth step S16, the fibers 110SF of the first fiber assembly material 110GF1A released from tension shrink in the inside direction 100D2 in the transverse direction X. The distance between the pair bonded parts 141 in the transverse direction X is shortened as the fibers 110SF shrink. As a result, the bent region 120E is formed in the base 120. Further, the bent region 122E is formed in the second sheet element 122. In this manner, the separation region 133 is formed in the insertion opening 131.

This is an example embodiment that corresponds to the "step of forming a bent region in the base by releasing the application of tension from the first fiber assembly and thereby shrinking the fibers stretched by the tension" according to this invention.

In this manner, the cleaning element 100 of the cleaning tool A according to the present invention is manufactured.

The present invention is not limited to the above-described embodiment and manufacturing method, but rather, may be added to, changed, replaced with alternatives or otherwise modified. For example, in the cleaning tool A of the above-described embodiment, the holder 200 is provided with the two holding members 221, and correspondingly the cleaning element 100 is provided with the two holding spaces 130. However, a single holding space 130 may be provided for the two holding members 221, or a single holding member 221 and a single holding space 130 may be provided.

Now, modifications to the above-described embodiment are explained. Components identical or corresponding to those in the cleaning tool A of the above-described embodiment are given like numerals and are not described.

(First Modification)

Figure 18:
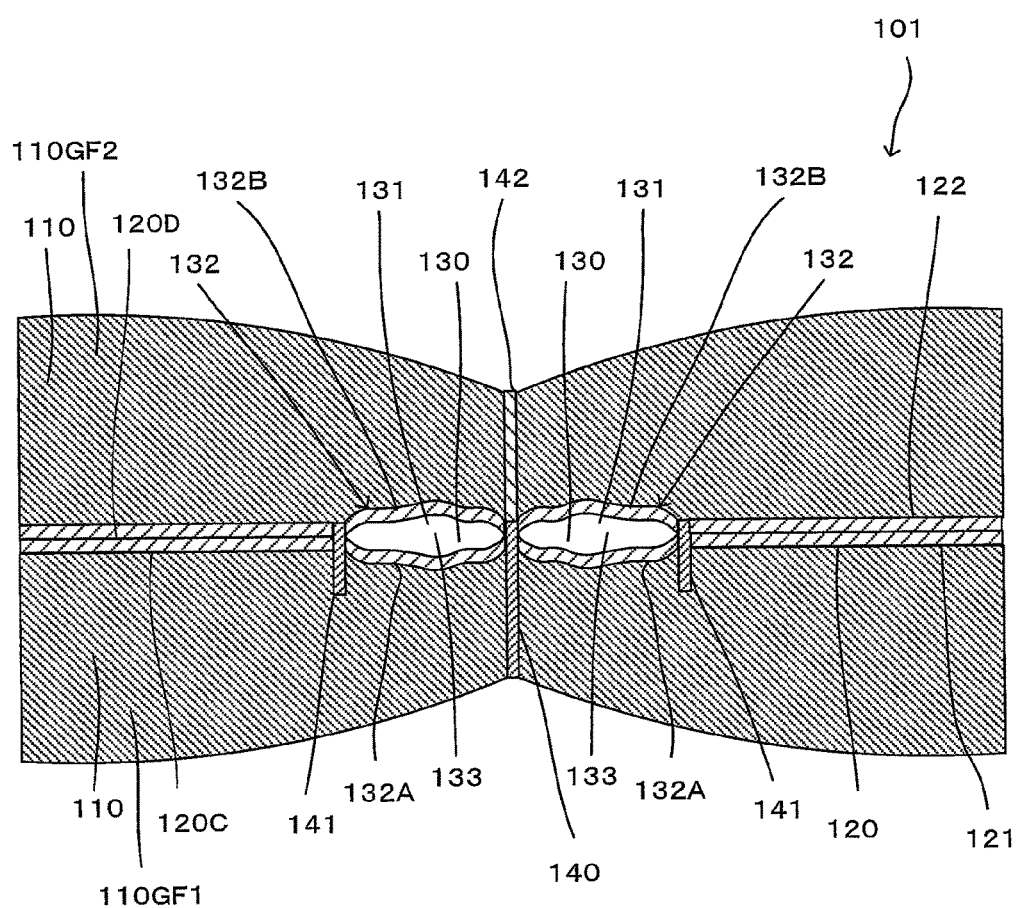
FIG. 18 is an explanatory drawing of a cleaning element according to a first modification of the present invention.

A first modification is explained with reference to FIG. 18. A cleaning element 101 of the first modification is different from the cleaning element 100 of the above-described embodiment in that the brush part 110 is formed not only on the one side 120C of the base 120, but also on the other side 120D of the base 120.

Specifically, a second fiber assembly 110GF2 is welded at the central region to form a second bonded part 142. The second fiber assembly 110GF2 having the second bonded part 142 is then bonded to the second sheet element 122 by an adhesive (not shown). In this manner, the cleaning element 101 is formed.

In the cleaning element 101 of the first modification, the same effect as the cleaning element 100 of the above-described embodiment can be obtained.

Figure 19:
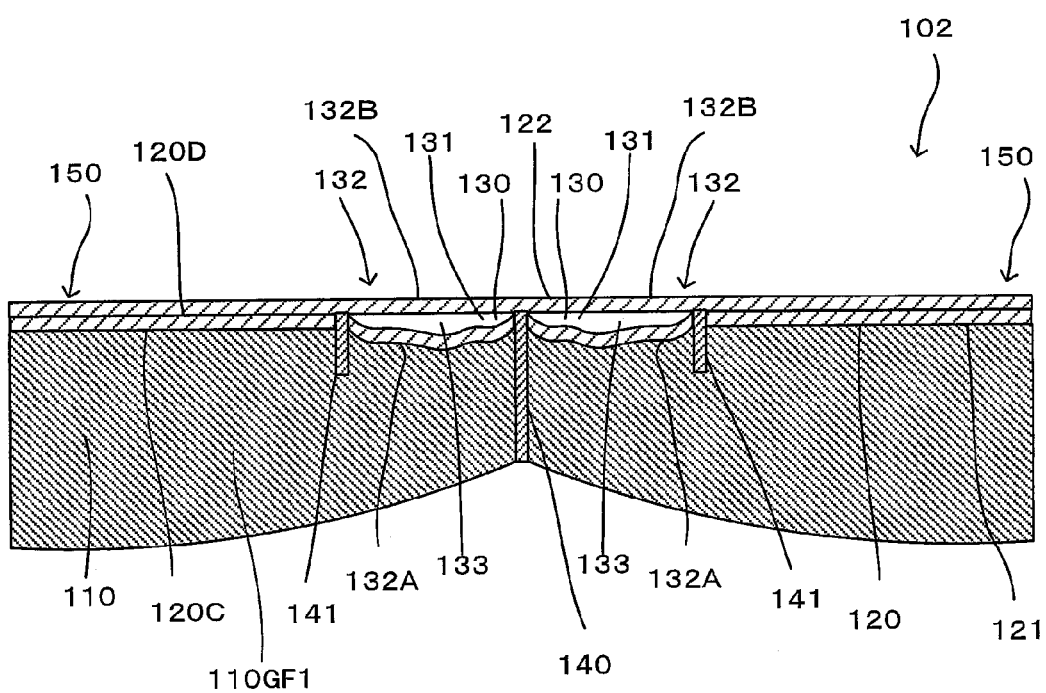
FIG. 19 is an explanatory drawing of a cleaning element according to a second modification of the present invention.

(Second Modification) A second modification is explained with reference to FIG. 19. A cleaning element 102 of the second modification is different from the cleaning element 100 of the above-described embodiment in that the bent region 120E is formed only in the base 120. Specifically, the first edge region 132A is longer than the second edge region 132B in the transverse direction X.

The separation region 133 is formed in the insertion opening 131 by providing the bent region 120E in the base 120.

Therefore, in the cleaning element 102 of the second modification, the same effect as the cleaning element 100 of the above-described embodiment can be obtained.

Figure 20:
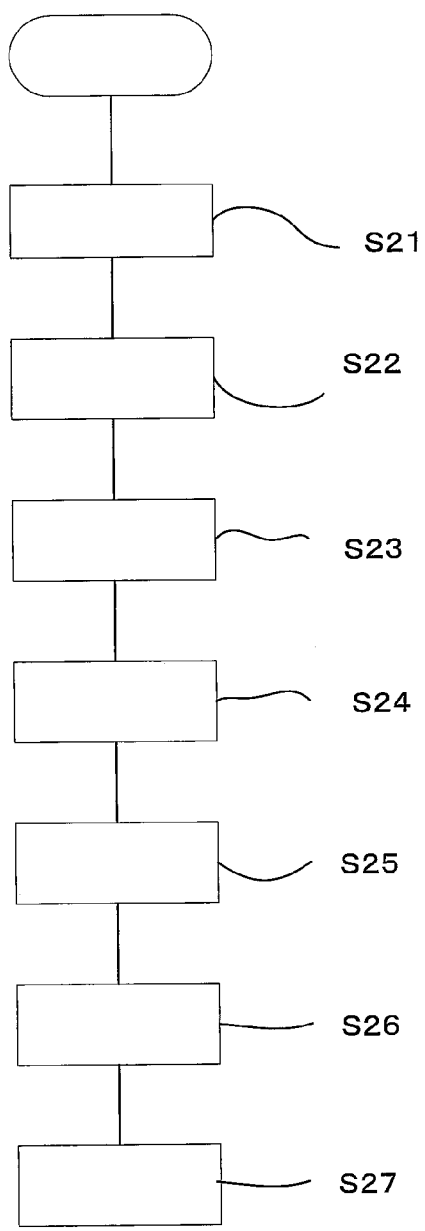
FIG. 20 is a flow chart for showing a manufacturing process according to the second modification of the present invention.

FIG. 20 is a flow chart showing the manufacturing process for the cleaning element 102 of the second modification. The manufacturing process includes a first step S21 of laminating materials for the base 120 and part of the fiber assembly 110GF, a second step S22 of bonding the materials laminated in the first step S21, a third step S23 of laminating part of the fiber assembly 110GF on the materials bonded in the second step S22, a fourth step S24 of bonding the materials laminated in the third step S23, a fifth step S25 of cutting the materials bonded in the fourth step S24 into a prescribed shape, a sixth step S26 of forming the bent region 120E in the base 120, and a seventh step S27 of forming the insertion opening 131 by the bent region 120E.

The cleaning element 102 of the second modification has the strips 150, but the manufacturing process of the strips 150 is not described for convenience of explanation.

Figure 21:
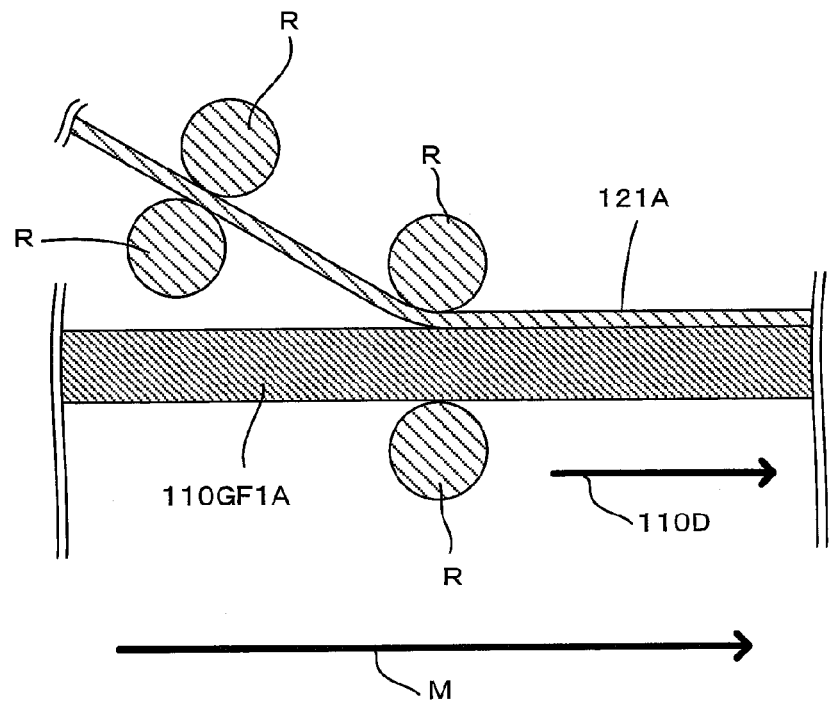
FIG. 21 is an explanatory drawing for illustrating a first step.

FIG. 21 shows the first step S21. In the first step S21, the first sheet material 121A for forming the first sheet element 121 for the base 120 and the first fiber assembly material 110GF1A for forming part of the first fiber assembly 110GF1 are fed. As a result, the first fiber assembly material 110GF1A is disposed on one side of the first sheet material 121A.

Figure 22:
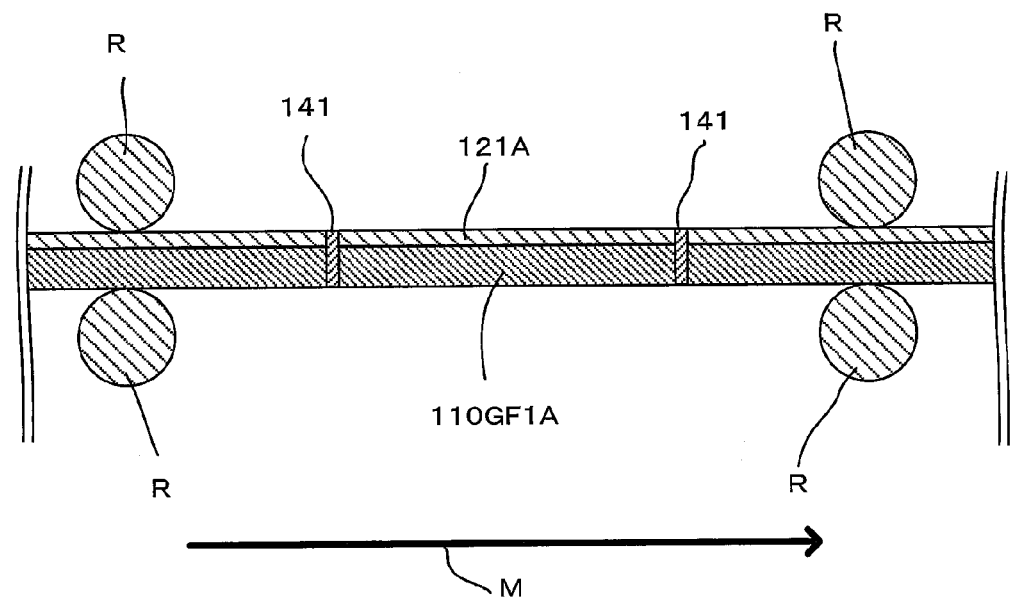
FIG. 22 is an explanatory drawing for illustrating a second step.

FIG. 22 shows the second step S22. In the second step S22, the first sheet material 121A and the first fiber assembly material 110GF1A are all welded. At this time, the first sheet material 121A and the first fiber assembly material 110GF1A are welded at two parts in prescribed regions. The welded parts form a pair of the first bonded parts 141.

Figure 23:
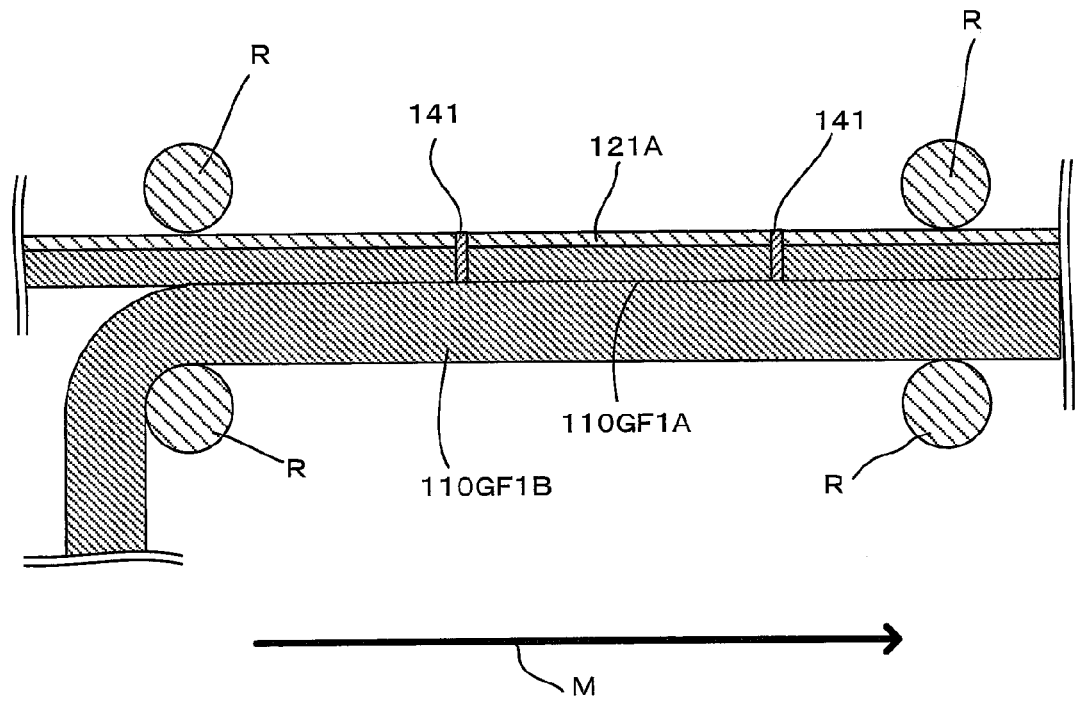
FIG. 23 is an explanatory drawing for illustrating a third step.

FIG. 23 shows the third step S23. In the third step S23, a second fiber assembly material 110GF1B is fed. The second fiber assembly material 110GF1B is fed onto one side of the first fiber assembly material 110GF1A on which the first sheet material 121A is not disposed.

Figure 24:
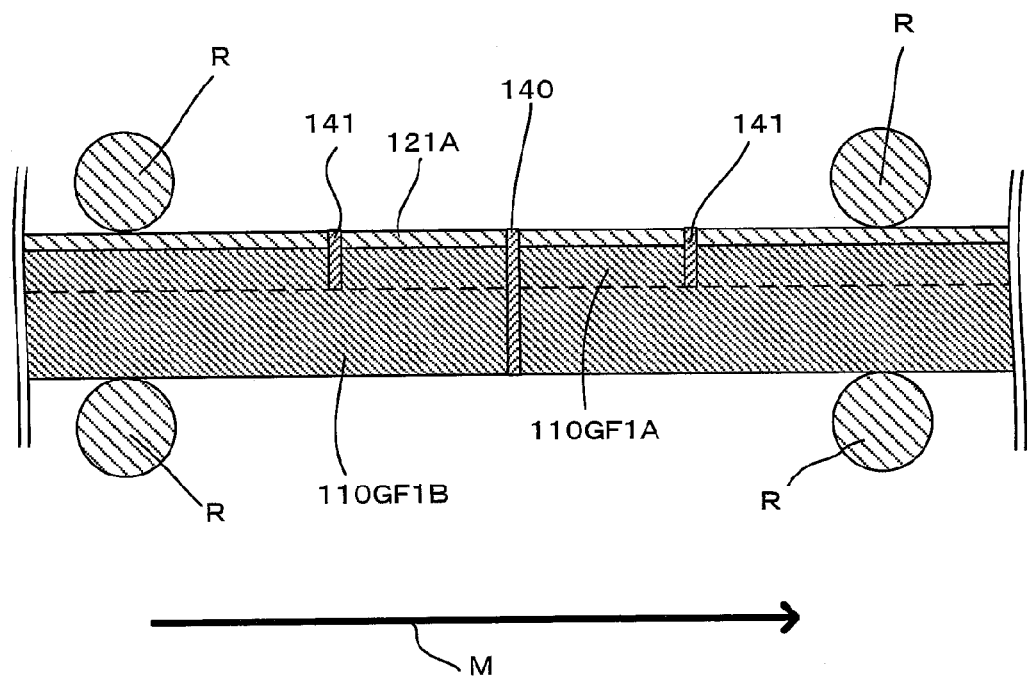
FIG. 24 is an explanatory drawing for illustrating a fourth step.

FIG. 24 shows the fourth step S24. In the fourth step S24, the first sheet material 121A, the first fiber assembly material 110GF1A and the second fiber assembly material 110GF1B are all bonded by heat welding. This bonding is made at an intermediate part between the first bonded parts 141. This bonded part forms the central bonded part 140.

Figure 25:
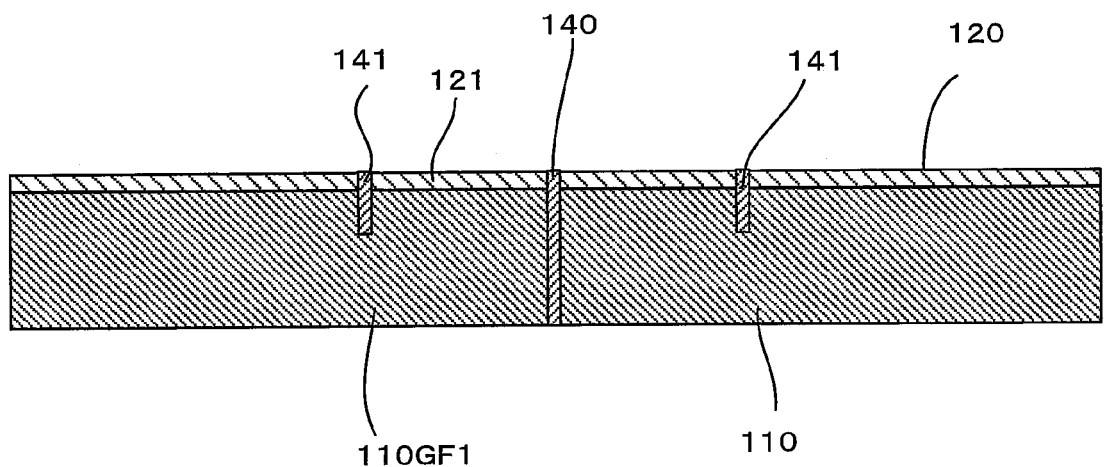
FIG. 25 is an explanatory drawing for illustrating a fifth step.

FIG. 25 shows the fifth step S25. In the fifth step S25, the first sheet material 121A, the first fiber assembly material 110GF1A and the second fiber assembly material 110GF1B are cut at prescribed regions. By this cutting, the first sheet material 121A, the first fiber assembly material 110GF1A and the second fiber assembly material 110GF1B are released from tension.

Figure 26:
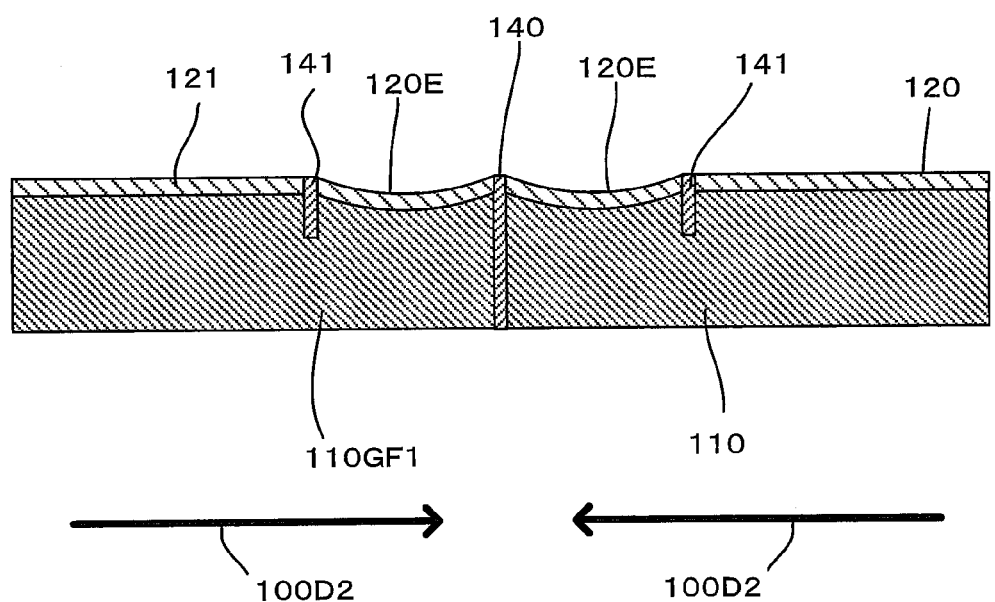
FIG. 26 is an explanatory drawing for illustrating a sixth step.

FIG. 26 shows the sixth step S26. In the sixth step S26, the fibers 110SF of the first fiber assembly material 110GF1A released from tension shrink in the inside direction 100D2 in the transverse direction X. The distance between the pair bonded parts 141 in the transverse direction X is shortened as the fibers 110SF shrink. As a result, the bent region 120E is formed in the base 120.

Figure 27:
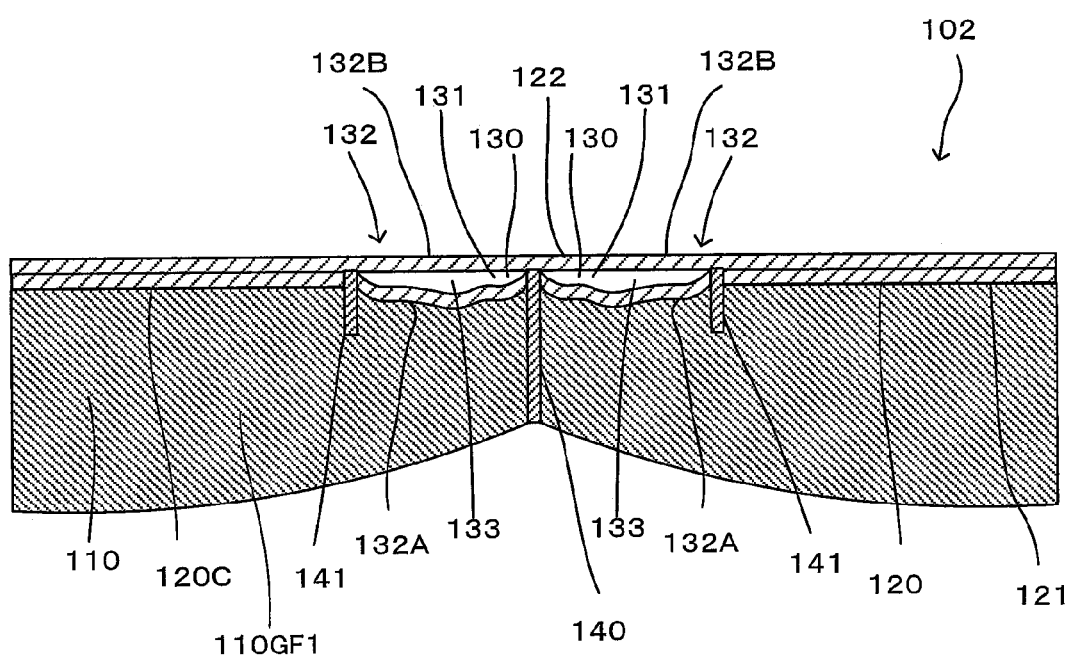
FIG. 27 is an explanatory drawing for illustrating a seventh step.

FIG. 27 shows the seventh step S27. In the seventh step S27, the second sheet element 122 having a prescribed shape is connected to the other side 120D of the base 120. Further, the second sheet element 122 can be bonded to the base 120, for example, by an adhesive (not shown). Specifically, in order to bond the second sheet element 122 to the base 120, the adhesive is applied to regions of the other side 120D of the base 120 corresponding to the central bonded part 140 and the first bonded parts 141.

In this manner, the cleaning element 102 of the cleaning tool A according to the second modification is manufactured.

Correspondences Between the Features of the Embodiment and the Features of the Invention The cleaning tool A is an example embodiment that corresponds to the "cleaning tool" according to this invention. The cleaning element 100, 101, 102 is an example embodiment that corresponds to the "cleaning sheet" according to this invention. The cleaning element holder 200 is an example embodiment that corresponds to the "holder" according to this invention. The first fiber assembly 110GF1 is an example embodiment that corresponds to the "first fiber assembly" according to this invention. The base 120 is an example embodiment that corresponds to the "base" according to this invention. The bent region 120E is an example embodiment that corresponds to the "bent region" according to this invention. The fiber 110SF is an example embodiment that corresponds to the "fiber" according to this invention. The first sheet element 121 and the second sheet element 122 are example embodiments that correspond to the "first sheet element" and the "second sheet element", respectively, according to this invention. The insertion opening 131 is an example embodiment that corresponds to the "insertion opening" according to this invention. The one side 120C and the other side 120D are example embodiments that correspond to the "one side" and "the other side", respectively, according to this invention. The second fiber assembly 110GF2 is an example embodiment that corresponds to the "second fiber assembly" according to this invention.

Embodiments and modifications of the present invention are not limited to those described above. The structures or features of the above-described embodiment and modifications can be appropriately used in combination, and can be added to, changed, replaced with alternatives or otherwise modified.

In view of the nature of the above-described invention, a according to this invention can be provided with various features as follows.

(Aspect 1)
A method of manufacturing a cleaning tool having a cleaning sheet and a holder for holding the cleaning sheet, wherein the cleaning sheet has a base and a first fiber assembly connected to the base, comprising the steps of:
stretching at least part of fibers forming the first fiber assembly by applying a prescribed tension at least to the first fiber assembly,
bonding the stretched first fiber assembly to the base, and
forming a bent region in the base by releasing the application of tension from the first fiber assembly and thereby shrinking the fibers stretched by the tension.

(Aspect 2)
The method as defined in aspect 1, wherein the prescribed tension applied to the first fiber assembly is applied to all of the fibers forming the first fiber assembly.

(Aspect 3)
The method as defined in aspect 1, wherein the prescribed tension applied to the first fiber assembly is applied only to fibers in a region of the first fiber assembly which is bonded to the base.

(Aspect 4)
The method as defined in any one of aspects 1 to 3, wherein a prescribed tension is applied to the base in the step of bonding the stretched first fiber assembly to the base.

(Aspect 5)
The method as defined in any one of aspects 1 to 4, wherein the base comprises a first sheet element.

(Aspect 6)
The method as defined in aspect 5, wherein an insertion opening through which the holder is inserted is formed by superposing a second sheet element on the first sheet element and bonding the sheet elements.

(Aspect 7)
The method as defined in any one of aspects 1 to 6, comprising a step of forming an insertion opening by the bent region.

(Aspect 8)
The method as defined in aspect 7, wherein the step of forming the insertion opening by the bent region comprises a step of superposing the first fiber assembly, the first sheet element and the second sheet element and a step of bonding the first fiber assembly, the first sheet element and the second sheet element, and wherein the application of tension is released from the first fiber assembly after the insertion opening is formed.

(Aspect 9)
The method as defined in aspect 7, wherein the step of forming the insertion opening by the bent region comprises the steps of:
bonding the first fiber assembly and the first sheet element,
forming a bent region in the first sheet element by releasing the application of tension from the first fiber assembly,
superposing the second sheet element on the first sheet element, and
bonding the first sheet element and the second sheet element.

(Aspect 10)
The method as defined in any one of aspects 6 to 9, wherein the second sheet element has a second fiber assembly.

(Aspect 11)
The method as defined in any one of aspects 1 to 10, wherein the insertion opening is always kept open.

(Aspect 12)
The method as defined in any one of aspects 1 to 11, wherein the base and the first fiber assembly have different elastic constants.

(Aspect 13)
A method of manufacturing a cleaning sheet which is held by a holder to form a cleaning tool, wherein the cleaning sheet has a base and a first fiber assembly connected to the base, comprising the steps of:
stretching at least part of fibers forming the first fiber assembly by applying a prescribed tension at least to the first fiber assembly,
bonding the stretched first fiber assembly to the base, and
forming a bent region in the base by releasing the application of tension from the first fiber assembly and thereby shrinking the fibers stretched by the tension.

The invention claimed is:
1. A method of manufacturing a cleaning tool, wherein the cleaning sheet has a first sheet element, a second sheet element, and a first fiber assembly, said method comprising:
stretching at least part of fibers forming the first fiber assembly by applying a prescribed tension to obtain a stretched first fiber assembly,
bonding the stretched first fiber assembly to the first sheet element, superposing and bonding the second sheet element to the first sheet element, wherein the first sheet element is sandwiched between the stretched first fiber assembly and the second sheet element, and forming a first bent region in the first sheet element by releasing the application of the prescribed tension from the stretched first fiber assembly to cause shrinking of the fibers stretched by the prescribed tension, wherein an insertion opening is always kept open between the first sheet element and the second sheet element for a holder of the cleaning tool to be inserted, and the first sheet element and the first fiber assembly have different elastic constants.

2. The method as defined in claim 1, wherein the prescribed tension applied to the first fiber assembly is applied to all of the fibers forming the first fiber assembly.

3. The method as defined in claim 1, wherein the prescribed tension applied to the first fiber assembly is applied only to fibers which are directly bonded to the first sheet element.

4. The method as defined in claim 1, wherein said bonding the stretched first fiber assembly to the first sheet element includes applying another prescribed tension to the first sheet element.

5. The method as defined in claim 1, comprising forming the insertion opening by the first bent region.

6. The method as defined in claim 5, wherein said forming the insertion opening by the first bent region comprises:

superposing the stretched first fiber assembly, the first sheet element, and the second sheet element; and bonding the stretched first fiber assembly, the first sheet element, and the second sheet element, and wherein the application of the prescribed tension is released from the stretched first fiber assembly after the insertion opening is formed.

7. The method as defined in claim 5, wherein said forming the insertion opening by the first bent region comprises:

bonding the stretched first fiber assembly and the first sheet element together, forming the first bent region in the first sheet element by releasing the application of the prescribed tension from the stretched first fiber assembly, superposing the second sheet element on the first sheet element after releasing the application of the prescribed tension from the stretched first fiber assembly, and bonding the first sheet element and the second sheet element.

8. The method as defined in claim 1, wherein the second sheet element has a second fiber assembly.

* * * * *